(12) United States Patent
Monereau

(10) Patent No.: US 7,025,801 B2
(45) Date of Patent: Apr. 11, 2006

(54) METHOD FOR CONTROLLING A UNIT FOR THE TREATMENT BY PRESSURE SWING ADSORPTION OF AT LEAST ONE FEED GAS

(75) Inventor: Christian Monereau, Paris (FR)

(73) Assignee: L'Air Liquide, Société Anonyme àl Directoire et Conseil de Surveillance pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 10/601,135

(22) Filed: Jun. 20, 2003

(65) Prior Publication Data

US 2004/0055462 A1 Mar. 25, 2004

(30) Foreign Application Priority Data

Jun. 21, 2002 (FR) .................................. 02 07717

(51) Int. Cl.
*B01D 53/047* (2006.01)
(52) U.S. Cl. .................. 95/8; 95/11; 95/12; 95/23; 95/96; 95/130; 95/139; 95/140
(58) Field of Classification Search ................ 95/8, 95/11, 12, 19, 21–23, 96–106, 130, 139, 140; 96/110, 111, 113–115, 130, 143
See application file for complete search history.

(56) References Cited

U.S. PATENT DOCUMENTS

| | | | | |
|---|---|---|---|---|
| 4,315,759 A | * | 2/1982 | Benkmann | 95/23 |
| 4,323,370 A | * | 4/1982 | Leitgeb | 95/23 |
| 4,472,177 A | * | 9/1984 | Sircar | 95/11 |
| 4,693,730 A | | 9/1987 | Miller et al. | |
| 5,258,056 A | * | 11/1993 | Shirley et al. | 95/22 |
| 5,529,607 A | * | 6/1996 | Tan | 95/12 |
| 5,730,778 A | * | 3/1998 | Hill et al. | 95/12 |
| 5,906,672 A | * | 5/1999 | Michaels et al. | 95/12 |
| 6,270,556 B1 | * | 8/2001 | Rouge et al. | 95/22 |
| 6,277,174 B1 | * | 8/2001 | Neu et al. | 95/12 |
| 6,290,750 B1 | * | 9/2001 | Ollivier et al. | 95/19 |
| 6,315,818 B1 | * | 11/2001 | Monereau | 95/98 |
| 6,733,568 B1 | * | 5/2004 | De-Souza et al. | 95/26 |
| 2002/0170428 A1 | * | 11/2002 | Murdoch et al. | 95/12 |
| 2004/0060445 A1 | * | 4/2004 | Fujimoto | 96/110 |

FOREIGN PATENT DOCUMENTS

GB 2227686 A * 8/1990

OTHER PUBLICATIONS

French Search Report to FR 02 07717.

* cited by examiner

*Primary Examiner*—Robert H. Spitzer
(74) *Attorney, Agent, or Firm*—Linda K. Russell; Christopher J. Cronin

(57) ABSTRACT

The treatment unit comprises N adsorption units, N being greater than or equal to 1, operating on a parametrized cycle split uniformly into at most N phase times. Further more, use is made of a control unit for controlling the treatment unit, designed to modify at least one parameter of the cycle. Each time there is a predicted change in the composition of the feed gas, the control unit is sent a pre-established signal representing this change. The processing unit then processes the signal to determine the parameters of an exceptional operating cycle of the treatment unit which cycle is suited to the predicted change.

26 Claims, 3 Drawing Sheets

METHOD FOR CONTROLLING A UNIT FOR THE TREATMENT BY PRESSURE SWING ADSORPTION OF AT LEAST ONE FEED GAS

CROSS-REFERENCE TO RELATED APPLICATIONS

This application claims the benefit of priority under 35 U.S.C. § 119(a) and (b) 1 to French Application No. 0207717, filed Jun. 21, 2002 the entire contents of which are incorporated herein by reference.

BACKGROUND

The present invention relates to a method for controlling a treatment unit for the treatment of at least one feed gas, by pressure swing adsorption, in which the treatment unit, commonly known as PSA unit, comprises N adsorption units, N being greater than or equal to 1, operating on a parametrized cycle typically split uniformly into at most N phase times. In the conventional way, the term "phase time" is used to describe the quotient of the duration of the cycle to the number of adsorbers in service.

PSA units are used to produce hydrogen, carbon monoxide, carbon dioxide, to dry gas, to separate the constituents of air with the production of nitrogen and/or oxygen, for carbon dioxide deballasting, etc.

The pressures indicated hereinbelow are all in bar absolute.

In general, the adsorbers of a PSA unit follow, staggered over time, an operating cycle, hereinafter known for convenience as the "PSA cycle" which is split uniformly into as many phase times as there are adsorbers in operation, and which is made up of basic steps, including the steps:
  of adsorption at practically a high pressure of the cycle;
  of cocurrent depressurization, generally from the high pressure of the cycle;
  countercurrent depressurization, generally down to the low pressure of the cycle;
  elution at practically a low pressure of the cycle; and
  repressurization, from the low pressure of the cycle to the high pressure of the cycle.

Depending on the application, the depressurization and repressurization steps may involve several sub-steps such as balancing the pressure between adsorbers or between adsorber and tank, etc. The presence of any arbitrary one of these steps in the PSA cycle does not in any way alter the scope of the present invention.

Hereinafter, we shall be concerned with the operation of a PSA unit in the steady state, that is to say outside of transient periods of starting up or shutting down the unit, that generally correspond to special cycles devised for that purpose.

The main constraint on the operation of a PSA unit in the steady state is the level of purity of the gas produced. Under this constraint, the operation of the PSA is therefore generally optimized either to maximize the extraction efficiency (amount of gas produced/amount of this gas present in the feed gas) or to minimize the power consumption, or alternatively to maximize the volume of gas produced.

For this, use is made of a PSA unit control unit designed to modify the parameters of the operating cycle of this unit. Conventionally, it has been proposed for this control unit to permanently receive signals typically representative of the flow rate of the feed gas stream and/or of the flow rate of the produced gas stream.

FIG. 1 of the attached drawings, which illustrates the prior art, depicts a PSA unit 1 for producing hydrogen and a control unit 2. The feed line 3 supplying the gas that is to be treated, is provided with a flow meter 4, the measurements of which are constantly transmitted to the control unit 2.

On the basis of the variation in the feed flow rate, the control unit modifies the duration of the phase time of the cycle so that the higher the flow rate, the shorter the phase time, and vice versa. This control is commonly known as "capacity control".

Known from other sources is a second type of control which consists in taking account of the purity of the treated gas in order to correct certain parameters of the PSA unit operating cycle. The PSA unit 1 of FIG. 1 for this purpose comprises an apparatus 6 for measuring the hydrogen content of the gas produced by the PSA unit. The measurements from this apparatus are transmitted periodically or continuously to the control unit to control the operation of the PSA unit. In the case, for example, of a produced hydrogen specification of 99.9%, that is to say for a minimum acceptable content of 99.9%, a measurement showing a hydrogen content equal to 99.99% leads to the control unit increasing the phase time, whereas a measurement equal to 99.91% leads to a reduction in this phase time, in order to have a margin at safety. This type of control is commonly known as "purity control monitoring". In some cases, only the purity control monitoring is employed, but controlling the PSA unit is then tricky.

Side by side with these main forms of control, there may be a certain number of controls internal to the PSA unit, which mean that the pressure cycle is run under the most uniform possible conditions. By way of example, the repressurization flow rate may be kept constant for the duration of the step, by action on a control valve.

However, in a certain number of cases, the main and internal controls sometimes prove inadequate to prevent the production run from becoming polluted.

In particular, in the case of treatment units comprising several adsorbers all in different states at the same instant, it is almost impossible for the parameters of the PSA cycle to be changed instantly and to a significant extent following, for example, a sharp increase in the feed gas flow rate. Amongst other things, it is of course necessary to complete the repressurizing of an adsorber before moving it on to an adsorption phase.

The same is true when the content of an impurity increases sharply in the feed gas, particularly if the impurity concerned is one that is difficult to stop, such as nitrogen or argon, and particularly if this impurity is in a relatively small quantity. By way of example, a nitrogen content increasing from 50 to 500 ppm will not modify the duration of the adsorption phase because its effect on the measurement of the flow rate will be negligible, but it will gradually pollute the adsorbent. The purity control monitoring will react, but with a delay and, depending on the parameters chosen for this control, there will be either a temporary pollution of the production, or the cycle will suddenly go out of control with the consequence of a significant loss of efficiency over some period of time.

One means used to alleviate this disadvantage is that of installing measurement means on the feed gas so as constantly to know its composition, pressure, temperature, density and flow rate characteristics and, on the basis of that, adjusting the cycle, or even changing cycle if the modifications are significant enough to justify so doing, according to the data measured.

FIG. 1 of the appended drawings depicts an analyser 8 for constantly, or sufficiently frequently, determining the composition of the feed gas. This information transmitted to the control unit 2 makes it possible, via the molecular mass of the feed gas which mass is calculated from this analysis, to determine the exact flow rate of feed gas.

Knowledge of the composition and of the flow rate then allows the system to recalculate the optimum cycle parameters.

If the feed gas consists of a mixture of several gases, flow meters and, if necessary, local analysers and/or densimeters can be installed in order, by summing, to reconstruct the composition and the flow rate of the whole feed gas.

The disadvantage with such a system is that it is expensive in terms of hardware (analysers), in terms of operating costs (calibration gas) and in terms of maintenance (calibration, etc). In addition, erroneous analysis due, for example, to an excessive drift in the apparatus, will lead to a cycle not suited to the actual feed gas, and leading either to a loss of production or to pollution.

The object of the present invention is to propose a control method for controlling a PSA unit that is simplified, of negligible cost by comparison with the analysis systems mentioned hereinabove, and which in many cases makes it possible to limit the risk of pollution and/or loss of production when there is a sudden and/or significant variation in the composition of the feed gas fed into this unit.

SUMMARY OF THE INVENTION

To this end, the subject of the invention is a method for controlling a treatment unit for treating at least one feed gas, which method is of the type in which the treatment unit comprises N adsorption units, N being greater than or equal to 1, operating on a parametrized cycle split uniformly into at most N phase times, and in which use is made of a control unit for controlling the treatment unit, designed to modify at least one parameter of the cycle, particularly on the basis of the measurement of values representing the flow rate and/or the composition of the feed gas entering the treatment unit and/or of the gas produced at the outlet of said treatment unit, and In which, each time there is a predicted change in the composition of the feed gas that Is to be treated, the control unit is sent a pre-established signal representing said change, and the processing unit processes said signal to determine the parameters of an exceptional operating cycle of the treatment unit which cycle is suited to said predicted change.

According to other characteristics of this method, that are taken in isolation or in any technically possible combination:

- said pre-established signal is representative of the intensity of the predicted change in the composition of the feed gas;
- a reference signal is constantly sent to the control unit, and each time there is a predicted change, said reference signal is modified to form the pre-established signal;
- the pre-established signal is determined on the basis of the operation of at least one unit arranged upstream of the treatment unit and at least partially forming the feed gas that is to be treated;
- the duration of the exceptional cycle is predetermined;
- the duration of the exceptional cycle is indicated to the control unit by the transmission of an end signal, said end signal being pre-established on the basis of the predicted change in the composition of the feed gas;
- during each parametrized operating cycle of the treatment unit there are, in succession, a phase of adsorption, at practically a high pressure of the cycle and a phase of regeneration comprising a step of depressurization down to a low pressure of the cycle and a step of repressurization practically up to said high pressure of the cycle, and the parameters of the exceptional cycle that are determined by the control unit are chosen from the duration of the phase time and the duration of at least one of the steps of the regeneration phase;
- a signal representing the flow rate and/or the density of the feed gas stream is sent regularly to the control unit, and the control unit determines the parameters of the exceptional operating cycle of the treatment unit then adjusts these parameters on the basis of the signal representing the flow rate and/or the density of said feed gas stream;
- a signal representing the flow rate and/or the composition of the gaseous stream produced by the treatment unit is sent regularly to the control unit, and the control unit determines the parameters of the exceptional operating cycle of the treatment unit, then adjusts these parameters on the basis of the signal representing the flow rate and/or the composition of said gaseous stream produced; and
- the treatment unit is a unit for the production of practically pure hydrogen.

BRIEF DESCRIPTION OF THE DRAWINGS

The invention will be better understood from reading the description which will follow, given solely by way of example and made with reference to the drawings in which.

DESCRIPTION OF PREFERRED EMBODIMENTS

The subject of The invention is a method for controlling a treatment unit for treating at least one feed gas, which method is of The type in which the treatment unit comprises N adsorption units, N being greater Than or equal to 1, operating on a parametrized cycle split uniformly into at most N phase times, and in which use is made of a control unit for controlling the treatment unit, designed to modify at least one parameter of the cycle, particularly on the basis of the measurement of values representing the flow rate and/or the composition of the feed gas entering the treatment unit and/or of the gas produced at the outlet of said treatment unit, and in which, each time there is a predicted change in the composition of the feed gas that is to be treated, the control unit Is sent a pre-established signal representing said change, and the processing unit processes said signal to determine the parameters of an exceptional operating cycle of the treatment unit which cycle is suited to said predicted change.

Figure 2:
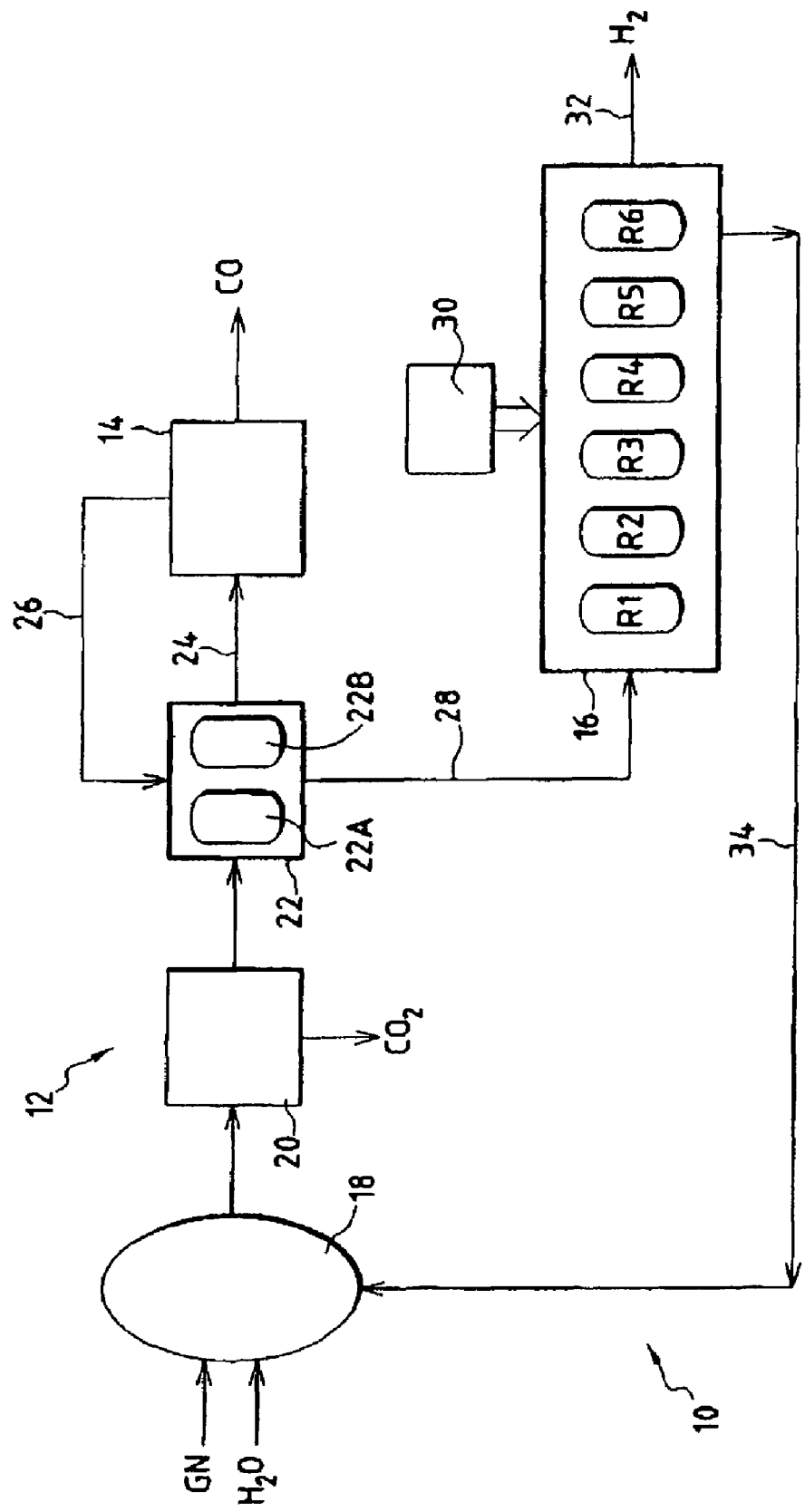
FIG. 2 is a schematic view of a plant for the combined production of hydrogen and carbon monoxide, comprising a PSA unit controlled according to the invention.

FIG. 2 depicts a plant 10 for the combined production of hydrogen and carbon monoxide from the steam reforming of a feed gas consisting of natural gas GN. The installation comprises a natural gas treatment line 12, downstream of which are connected both a cryogenic unit 14 for the production of carbon monoxide (CO) and a unit 16 for the production of hydrogen ($H_2$), both of which units are detailed later on.

The treatment line 12 comprises, from the upstream side downstream:
- a reactor 18 in which the natural gas is desulphurized, the heavy hydrocarbons are broken down into methane and carbon dioxide, and the methane is converted into a hydrogen-rich synthetic gas containing carbon monoxide and carbon dioxide;
- an amine scrubbing unit 20, the carbon dioxide-rich residual stream from which is tapped off; and
- a purification unit 22 for catching almost all the water and carbon dioxide.

A first outlet 24 of the purification unit 22 is connected to the cryogenic unit 14 which comprises a return line 26 returning to the purification line. A second outlet 28 of the purification unit 22 is connected to the PSA unit 16 so as to transport the feed gas to this unit.

The purification unit 22 comprises two bottles of adsorbent 22A, 22B placed in line alternately to purify, by adsorption, the gaseous mixture leaving the amine scrubbing unit 20.

The unit 22 also comprises valves, connecting pipes and control means not depicted in FIG. 2, designed to both subject one of the two bottles 22A, 22B in adsorption to the stream leaving the unit 20, and to sweep the other of the two bottles, that is to say the one in regeneration, using the stream leaving the line 26.

The unit 16 for its part comprises six adsorbers R1 to R6 each comprising adsorbent materials designed to fix, by adsorption, impurities such as water, carbon dioxide, methane, carbon monoxide, contained in the feed gas of the line 28. Various types of adsorbent material are conceivable, such as activated charcoals, silica gels and/or molecular sieves. The unit 16 is of PSA type. It therefore comprises pipes and valves, not depicted, and a control unit 30 detailed later, all designed to cause each adsorber R1 to R6 to follow a cycle of period T, consisting of six nominal phase times of the same duration, and one example of which is given in FIG. 3. By considering that the cycle depicted applies from the instant t=0 t=T to the adsorber R6, the operation of the adsorber R5 can be deduced from this by shifting it in time by T/6, that of the adsorber R4 by shifting in time by 2T/6, and so on down to the adsorber R1, obtained by shifting in time by 5T/6.

Figure 3:
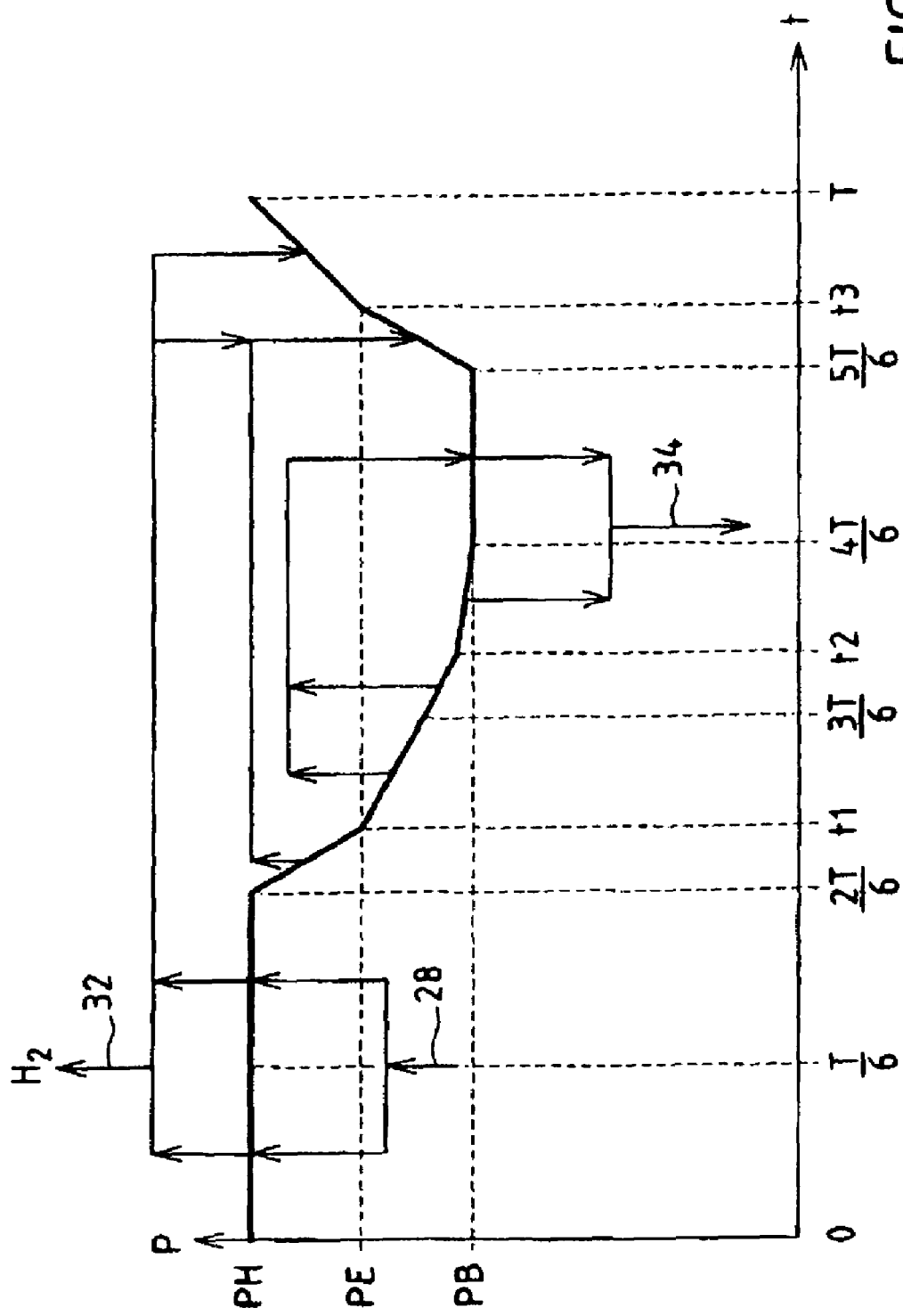
FIG. 3 is an operating diagram for the PSA unit of FIG. 2.

Per phase time/adsorber pairing, this amounts, in FIG. 3, to considering that the adsorber R6 follows the first phase time depicted between the instants t=0 and t=T/6, the adsorber R5 follows the second phase time depicted between the instants t=T/6 and t=2T/6, and so on down to the adsorber R1 which follows the sixth phase time depicted between the instants t=5T/6 and t=T.

In FIG. 3, where the times t are plotted on the abscissa axis and the absolute pressures P plotted on the ordinate axis, the lines orientated with the arrows show the movements and destinations of the gaseous flows and, moreover, the direction of flow through the adsorbers R1 to R6: when an arrow points in the direction of increasing ordinate-axis value (towards the top of the diagram), the current is said to be cocurrent in the adsorber; if the upwardly pointing arrow is situated beneath the mark indicating the pressure in the adsorber then the current is entering the adsorber via the inlet end of this adsorber; if the upwardly pointing arrow is situated above the mark indicating the pressure, the current is leaving the adsorber via the outlet end of the adsorber, the inlet and outlet ends being respectively those of the gas that is to be treated and of the gas tapped off in production. When an arrow is pointing in the direction of decreasing ordinate-axis value (towards the bottom of the diagram), the current is said to be countercurrent in the adsorber; if the downwardly pointing arrow is situated beneath the mark indicating the pressure in the adsorber, then the current is leaving the adsorber via the inlet end of this adsorber; if the downwardly pointing arrow is situated above the mark indicating the pressure, the current is entering the adsorber via the outlet end of this adsorber, the inlet and outlet ends still being those of the gas that is to be treated and of the gas tapped off in production. The inlet end of the adsorbers is their lower end.

Thus, for example, in the case of the adsorber R6, the cycle involves an adsorption phase from t=0 to t=2T/6 and a regeneration phase from t=2T/6 to t=T.

Specifically, during the adsorption phase, the impure feed gas conveyed by the line 28 arrives at the inlet to the adsorber at a high adsorption pressure, denoted PH on the cycle of FIG. 3, of about 20 bar. A stream of practically pure hydrogen is then drawn off at the top, under the same pressure, and partially feeds a hydrogen production line 32, the rest being sent to another adsorber during its repressurization step described later on.

The regeneration phase comprises, from t=2T/6 to t=4T/6:
- from t=2T/6 to t=t1, t1 being less than 3T/6, a first cocurrent depressurization step during which the outlet of the adsorber R6 is connected to that of another adsorber at the beginning of the repressurization step described later on, until the pressures in the two adsorbers balance at an equilibrium pressure denoted PE;
- from t1 to t=t2, t2 being less than 4T/6, a second cocurrent depressurization step during which the stream leaving the adsorber R6 in a cocurrent manner is decompressed and sent to the outlet of adsorbers in the elution step described later on; and
- from t2 to t=4T/6, a countercurrent depressurization step during which the stream leaving the adsorber R6 is sent to a residual line 34 connected at outlet to the reactor 18; this step is continued down to the low pressure of the cycle, denoted PB, and quantified at about 1.6 bar.

The regeneration phase then comprises, from t=4T/6 to t=5T/6, an elution step during which the adsorbent material is swept in a countercurrent manner with an elution gas so as to desorb almost all of the impurities previously adsorbed. The stream leaving the adsorber forms a residual gas at the low pressure PB, sent to the line 34.

The regeneration phase finally comprises:
- from t=5T/6 to t=t3, a first countercurrent repressurization step during which the adsorber receives both part of the streams from the adsorbers in the adsorption phase and the stream from the adsorber in the first cocurrent depressurization step; and
- from t=t3 to t=T, a second countercurrent repressurization step during which the adsorber receives only some of the streams from the adsorbers in the adsorption phase up to the high pressure PH.

Figure 4:
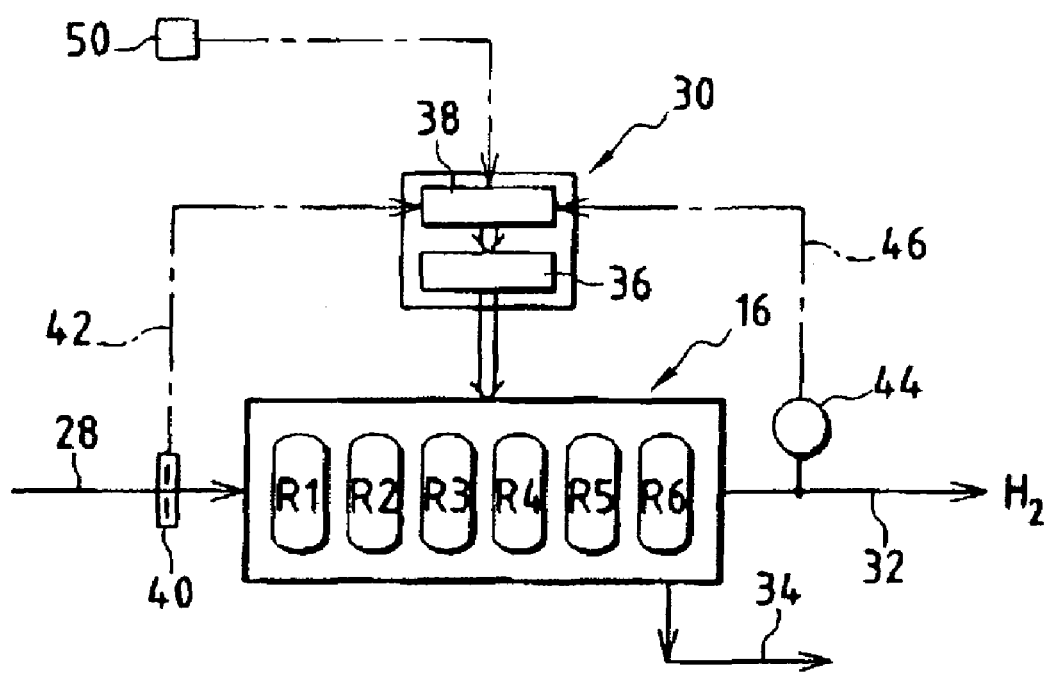
FIG. 4 is a view similar to that of FIG. 1, illustrating an exemplary implementation of the method according to the invention.

FIG. 4 depicts the architecture of the control unit 30 in greater detail: it comprises a control sequencer 36 designed to drive the PSA unit 16, that is to say to send the various control signals for controlling the valves of the PSA unit so as to cause the six adsorbers R1 to R6 to follow the operating cycle described hereinabove. The control unit 30 further comprises a microprocessor 38 capable of modifying the control instructions of the sequencer 36, that is to say capable, in response to signals detailed hereinafter, of controlling the parameters of the cycle that are imposed on the adsorbers by the sequencer.

For this purpose, the feed line 28 is advantageously equipped with a flow meter 40 connected, for example via a signal lead 42, to the regulator 38. In addition, the production line 32 may be provided with an apparatus 44 designed to continuously analyse the carbon monoxide content of the practically pure hydrogen stream tapped off from the unit 16. The analysis apparatus 44 is connected to the controller 38, for example via a signal lead 46. Finally, the control unit is connected to an external signals source 50, the function of which will be detailed during the description of the operation of the plant 10.

The overall operation of the plant 10 is as follows.

In the steady state, that is to say outside of periods of transition, of starting up or of shutting down the plant, the reactor 18 is fed with natural gas and with water, and produces a mixture rich in hydrogen, in carbon monoxide and in carbon dioxide, and containing also methane, nitrogen, water and traces of heavy hydrocarbons.

By amine scrubbing in the unit 20 and purification in the unit 22, the stream conveyed by the line 24 has both high hydrogen and high carbon monoxide contents, for example equal to 73.5 mol % and 21.6 mol % respectively, low nitrogen and methane contents, for example equal to 1.1 mol % and 3.8 mol %.

The cryogenic unit 14 therefore produces a practically pure stream of carbon monoxide, discharging through the line 26 a hydrogen-rich gaseous mixture used for the successive regeneration of each of the bottles 22A and 22B of the purification unit 22.

By way of example, the mixture conveyed through the line 26 contains 97.4 mol % hydrogen, 0.3% nitrogen, 0.3% carbon monoxide and 2% methane. The stream leaving the bottle 22A, 22B being regenerated is sent to the line 28, which continuously carries this stream to the PSA unit 16. The operation of this PSA unit is dictated by the sequencer 36 of the control unit 30, for example causing the adsorbers R1 to R6 to follow the cycle of FIG. 3.

This cycle can be permanently controlled by the controller 38, on the basis of the signals it receives.

Thus, in a known way, and as it will be mentioned later on, the measurements from the upstream flow meter 40 are continuously transmitted to the controller 38 so that if the flow rate of the feed stream 28 increases by comparison with the nominal flow rate for which the cycle of FIG. 3 was designed, the controller calculates a new phase time, shorter than the nominal phase time of the cycle of FIG. 3. This is what is known in the technique as capacity control. In the case, for example, of a nominal phase time denoted $T_\varphi^N$, the new phase time $T_\varphi$ is:

$$T_\varphi = T_\varphi^N \times \frac{\text{nominal flow rate}}{\text{flow rate measured by the flow meter 40}}$$

The controller 30 then devises a new cycle, appreciably shorter than that of FIG. 3, and determines a compatible moment for transmitting this new cycle to the sequencer, which will then impose it on the PSA unit. It will be understood that implementation by the sequencer 36 cannot always be instantaneous, and this is true for all the adsorbers. This is because it is necessary to wait for each adsorber to be in a passing or switching configuration, for example at the end of repressurization or of depressurization.

In the same way, and also in a way known per se as mentioned in the preamble, the apparatus 44 continuously transmits to the controller 38 the carbon monoxide content in the hydrogen stream produced. If this content nears a maximum determined value known to the controller 38, the latter determines a new cycle as explained above, and transmits it to the sequencer 36. This is what is commonly known as purity control monitoring. Using the same notations as before, the new phase time $T_\varphi$ is:

$$T_\varphi = T_\varphi^N \times \frac{\text{nominal flow rate}}{\text{flow rate measured by the flow meter 40}} \times C_A,$$

where $C_A$ is a corrective factor calculated by the controller 38. If the carbon monoxide content is above that required, the phase time is lengthened ($C_A$ strictly greater than 1), making it possible to reduce hourly hydrogen losses and therefore to increase the hydrogen extraction efficiency.

The above described capacity control and purity control monitorings thus make it possible to constantly optimize the operation of the PSA unit 16 from the point of view of the hydrogen extraction efficiency (amount of hydrogen produced by the unit/amount of hydrogen introduced into the unit).

Another kind of control is permitted by the signals source 50. The latter is designed to supply the controller 38, at a predetermined instant, with pre-established signals independent of the feed stream conveyed at said instant by the line 28 and of the production stream conveyed at said instant by the line 32.

On the basis of these signals and independently of those transmitted by the flow meter 40 and the apparatus 44, the controller 38 determines a new cycle and transmits it to the sequencer 36. Recourse to this "a priori control" is intended to get around the known control limits detailed above.

Looking again at the operation of the unit 10 described in the above, and focussing on the changes to the stream of feed gas conveyed by the line 28, it can be seen that, during the application of the regeneration gas conveyed by the line 26, the adsorbent material in the purifying bottle 22A or 22B beginning its regeneration is saturated with water, with carbon dioxide and with carbon monoxide. The first moments of regeneration of the adsorbent of one of the bottles of the purifying unit 22 are accompanied by a massive desorption of carbon monoxide, it being possible for the carbon monoxide content of the stream discharged into the line 28 to reach more than ten times that of the regeneration stream in the line 26. Applied unchecked to the PSA unit 16, this sudden and intense blast of carbon monoxide would bring about significant operating disturbances that would lead to a loss of hydrogen efficiency and/or produce pollution of the production stream from the unit 16. Capacity control is inoperative because the change to the feed gas concerns essentially its composition rather than its flow rate. The degradation of the purity of the produced stream would lead to activation of the purity control monitoring but too late to avoid polluting the adsorbers of the unit 16, pollution detection in the line 32 not coming into operation until several phase times after the onset of the sudden change in composition of the feed stream.

Given that the arrival of the blast of carbon monoxide is predictable, and has a content and duration that are known from experience, calculation or even an analysis during the start-up of the PSA unit is used so that the source 50 can signal the corresponding changes in the feed gas before this blast reaches the controller 38. The controller can then calculate new cycle parameters, particularly the duration of the phase time, the duration of the various cycle steps described above, etc, and conveniently anticipate temporary a typical operating modes.

The new cycle obtained is then sent, at the time the blast of carbon monoxide is predicted to arrive, to the sequencer 36.

By way of example, in response to the signal from the source 50, the controller 38 determines an exceptional phase time $T_\phi^{EXC}$ on the basis of which the unit 16 operates at least for the duration after which the adsorbent material of the adsorber 22A, 22B in the process of being regenerated is practically discharged of most of the carbon monoxide. The duration of this exceptional cycle is either predetermined, and the corresponding information is then contained in the control unit 30, or indicated to the controller 38 by a new signal from the source 50.

Thus, the control afforded according to the method according to the invention is implemented when needed and for the necessary duration.

Figure 1:
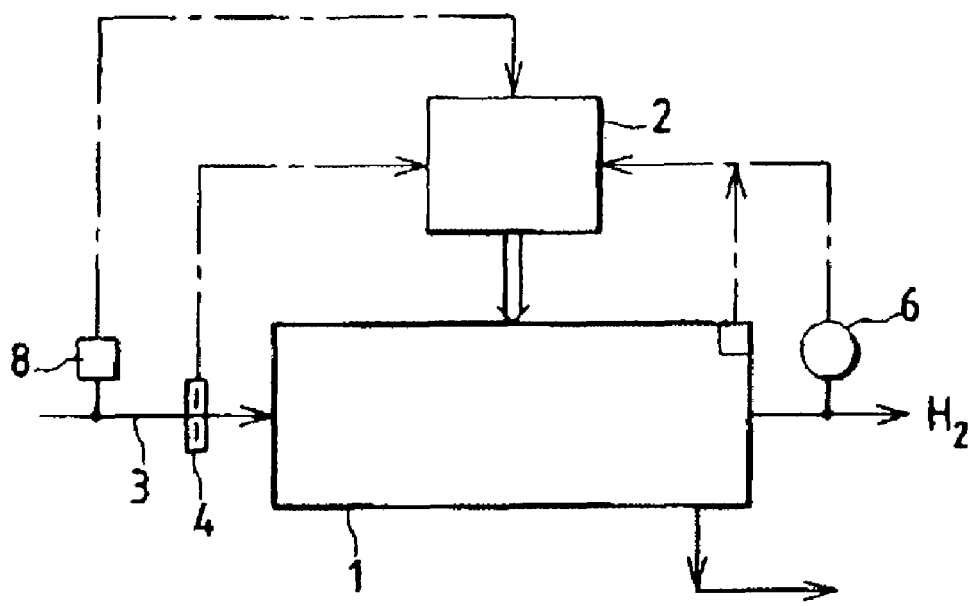
FIG. 1, mentioned above, is a schematic view of a PSA treatment unit associated with a control unit and controlled according to the techniques of the prior art.

Unlike the control described above with reference to FIG. 1, the signal transmitted does not give the composition of the feed gas but simply indicates the onset of a sudden change in composition, and possibly its end.

It makes it perfectly possible to forestall the effects of sudden changes in the status parameters of the PSA unit feed gas, particularly when a regenerated bottle of adsorbent comes back on line upstream, when a piece of equipment or a unit upstream is bypassed for maintenance or servicing, when a secondary feed gas is added to the main feed gas to periodically increase production, when there is a feed gas change, or when an upstream purification unit in one or more constituents such as a scrubbing unit is shut down; all these modifications correspond to predicted periodic operations for which the resulting exceptional PSA feed gas composition is determined by experience, by calculation or by initial analysis.

While the PSA unit 16 is operating on an exceptional cycle, capacity control (associated with the feed stream flow rate) can be left active. Likewise, purity control monitoring can be left active provided that the corrections introduced through this control (for example the corrective factor $C_A$) are subordinate to the a priori correction according to the invention. What this amounts to is that the controller 38 first of all determines the parameters of the exceptional cycle only on the basis of the signals transmitted by the source 50, then adjusts these parameters on the basis of information transmitted by the flow meter 40 and/or the analysis apparatus 44. For example, the phase time of the exceptional cycle may be obtained by the relationship $$T_\varphi = T_\varphi^{E \times C} \times \frac{\text{nominal flow rate of the line 28}}{\text{flow rate measured by the flow meter 40}} \times C_A.$$

As an alternative, the signals source 50 continuously sends a reference signal to the control unit 30, this reference signal being disturbed each time there is a predicted change in the composition of the feed gas. This alternative form allows the unit 30 to be connected permanently to the unit 50.

As another alternative, when the nature of the disturbance is known but its intensity varies from one occasion to another, it is possible to replace the simple start signal with information giving the level of the forthcoming modification, thus allowing the control system 30 to devise the most suitable cycle.

Returning to the example given above, just a fraction of the regeneration gas 26 is then used to regenerate the adsorber 22A or 22B. The PSA feed gas therefore consists of a mixture of gas containing a greater or lesser amount of carbon monoxide depending on the percentage used for regeneration. In this case, the signal sent is representative for example of this percentage.

If the sudden variation stems from the periodic addition of a second source of feed gas, then the signal is, for example, representative of the flow rate of the top-up gas or of the extent to which the inlet valve is open.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A method for controlling a treatment unit for treating at least one feed gas, comprising the following steps:
   (i) providing a pressure swing adsorption (PSA) treatment unit;
   (ii) supplying a product gas from the treatment unit which is operating on a parameterized cycle; and
   (iii) utilizing a control unit to control the treatment unit.

2. The method according to claim 1, wherein said treatment unit consists of N adsorption units.

3. The method according to claim 2, wherein said adsorption unit consists of at least one selected from the following: R1, R2, R3, R4, R5, and R6 units.

4. The method according to claim 1, wherein said control unit modifies at least one parameter of the feed gas, and/or the product gas.

5. The method according to claim 4, wherein said control unit receives a pre-established signal comprising a change in the process parameter.

6. The method according to claim 5, wherein said control unit processes said signal to determine the parameters of an exceptional operating cycle.

7. The method according to claim 6, wherein said signal is subject to a predicted change of the operating cycle.

8. The method according to claim 6, wherein said exceptional cycle consists of a predetermined duration.

9. The method according to claim 6, wherein the duration of said exceptional cycle is transmitted to the control unit via an end signal.

10. The method according to claim 9, wherein said end signal is pre-established subject to a predicted change in the composition of the feed gas.

11. The method according to claim 5, wherein intensity of said signal is subject to a change in the composition of the feed gas.

12. The method according to claim 5, wherein said pre-established signal is subject to the operation of at least one upstream unit of the treatment unit.

13. The method according to claim 5, wherein said pre-established signal comprises partially of the feed gas to be treated.

14. The method according to claim 5, wherein said parameters are selected from either the duration of the phase time ($T\phi^{exc}$) and/or the duration of at least one step from a regeneration phase.

15. The method according to claim 1, wherein said control unit comprises a constant reference signal.

16. The method according to claim 15, wherein said reference signal is modified to form a pre-established signal when there is a predicted change.

17. The method according to claim 1, wherein said parametrized operating cycle of the treatment unit comprises the following:
   (i) a phase of adsorption;
   (ii) a phase of regeneration; and
   (iii) repressurization.

18. The method according to claim 17, wherein said phase of adsorption occurs at a high pressure of the cycle.

19. The method according to claim 17, wherein said phase of regeneration comprises a step of depressurization down to a low pressure of the cycle.

20. The method according to claim 17, wherein said repressurization occurs at the high pressure of the cycle.

21. The method according to claim 1, wherein the method comprises the following steps:
   i) sending a signal regularly to the control unit that represents the flow rate and/or the density of the feed gas;
   ii) determining parameters of an exceptional operating cycle of the treatment unit; and
   iii) adjusting the parameters on the basis of the signal representing the flow rate and/or the density of said feed gas.

22. The method according to claim 1, wherein the method comprises the following steps:
   i) sending a signal regularly to the control unit that represents the flow rate and/or the composition of the product gas;
   ii) determining parameters of an exceptional operating cycle of the treatment unit; and
   iii) adjusting the parameters on the basis of the signal representing the flow rate and/or the composition of said product gas.

23. The method according to claim 1, wherein the treatment unit produces hydrogen.

24. The method according to claim 23, wherein the treatment unit produces substantially pure hydrogen.

25. A method for controlling a treatment unit for treating at least one feed gas, comprising the following steps:
   (i) providing a pressure swing adsorption (PSA) treatment unit;
   (ii) supplying a product gas from the treatment unit which is operating on a parameterized cycle; and
   (iii) utilizing a control unit to control the treatment unit;
   wherein said method comprises of a treatment unit that consists of N adsorption units selected from the following group: R1, R2, R3, R4, R5, and R6 unit, and whereby said control unit modifies at least one parameter of the feed gas, and/or the product gas.

26. A method for controlling a treatment unit for treating at least one feed gas, comprising the following steps:
   (i) providing a pressure swing adsorption (PSA) treatment unit;
   (ii) supplying a product gas from the treatment unit which is operating on a parameterized cycle; and
   (iii) utilizing a control unit to control the treatment unit;
   wherein said treatment unit consists of N adsorption units selected from the following group: R1, R2, R3, R4, R5, and R6 units, and
   whereby said control unit modifies at least one parameter of the feed gas, and/or the product gas and receives a pre-established signal comprising a change in the process parameter, and whereby said control unit processes said signal to determine the parameters of an exceptional operating cycle, and wherein said signal is subject to a predicted change in the operating cycle.

* * * * *